April 15, 1930.  T. C. RYAN  1,754,529
AEROPLANE
Filed Jan. 13, 1927

INVENTOR.
TUBAL C. RYAN
BY A.B. Bowman
ATTORNEY

Patented Apr. 15, 1930

1,754,529

UNITED STATES PATENT OFFICE

TUBAL C. RYAN, OF SAN DIEGO, CALIFORNIA

AEROPLANE

Application filed January 13, 1927. Serial No. 160,994.

My invention relates to aeroplanes, and more particularly to the monoplane type of aeroplane.

The objects of my invention are; first, to provide a monoplane in which the wing surface is mounted above the fuselage in such a manner that substantially unobstructed vision may be had ahead and downwardly without interference from the wing surface; second, to provide a monoplane of this class whereby blind angles are reduced to a minimum from the pilot cockpit so that the pilot may have substantially unobstructed vision above, ahead, between the wing surface and the covered front portion of the fuselage, downwardly, to the side and to the rear, above and below; third, to provide a monoplane of this class in which the wing surface is rigidly mounted on the frame of the fuselage and in which the cowling around the cockpit, or cockpits, is spaced below the wing surface for clear vision ahead and below from behind the wing surface; fourth, to provide an aeroplane having a fuselage provided with open cockpit to which entrance may be had from the side of the fuselage; and, fifth, to provide as a whole a novelly constructed aeroplane of this class and one which is particularly simple and economical of construction, particularly rigid, efficient and which will not readily deteriorate.

Figure 1:
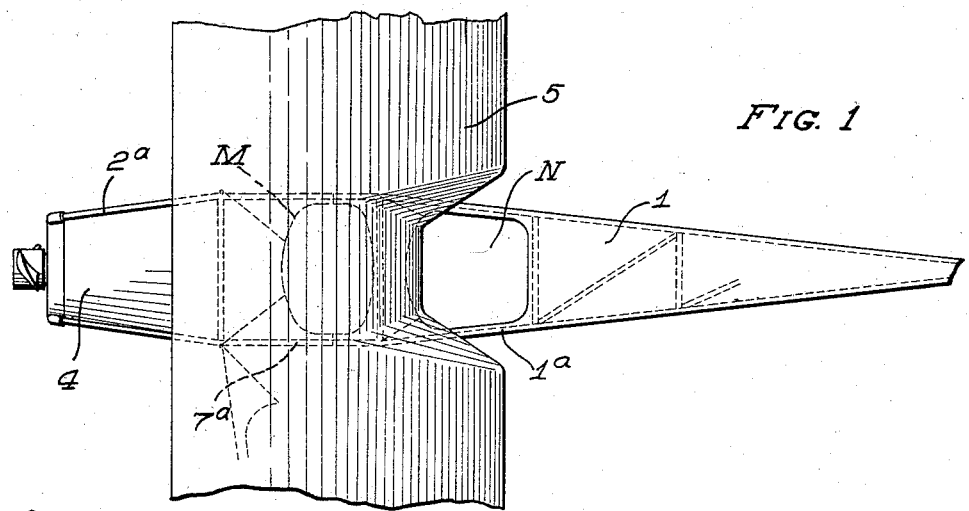
Figure 2:
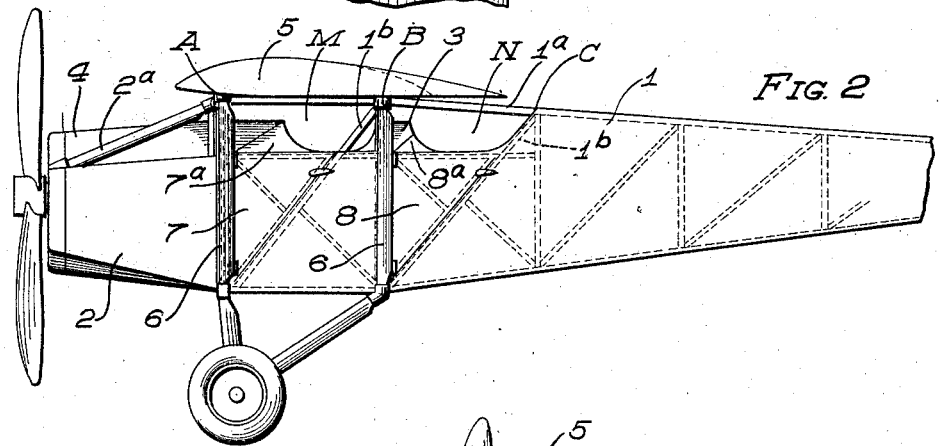
Figure 3:
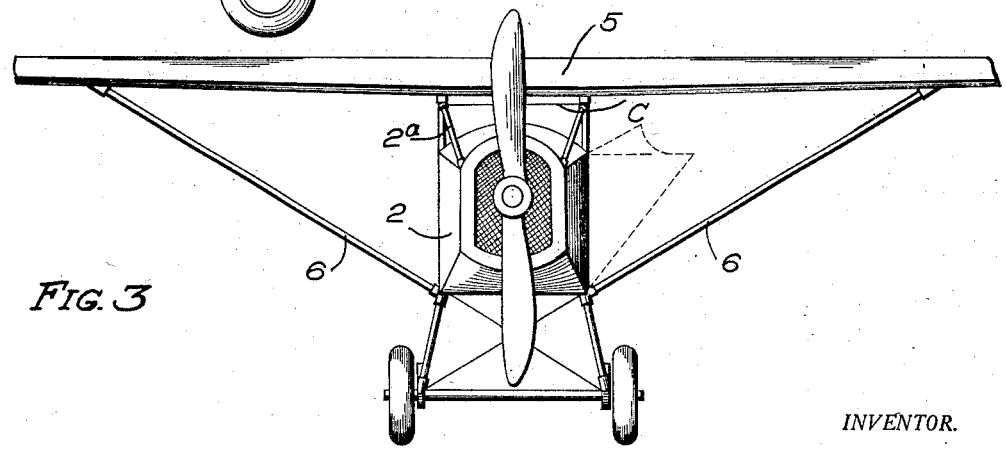

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon which form a part of this application in which:

Figure 1 is a fragmentary top view of my monoplane in which the ends of the wing and the tail surfaces are broken away; Fig. 2 is a fragmentary side elevational view thereof, showing the aeroplane in the position of flight; and, Fig. 3 is a fragmentary front elevational view thereof, showing one of the doors thereof by dotted lines in an open position.

Like characters of reference refer to similar parts and portions throughout the several views of the drawings.

The fuselage 1, nose 2, cowling 3, hood 4, wing 5, struts 6, and the doors 7 and 8 constitute the principal parts and portions of my aeroplane structure.

The general shape of the frame of the fuselage 1, behind the nose of the aeroplane, is substantially the same as many now in use and consists essentially of longérons 1ª extending from end to end and reinforced transversely by transverse struts and diagonal braces.

The wing 5 is secured at its middle portion in any suitable manner directly to the upper side and forward portion of the frame of the fuselage, the wing being secured to the fuselage at the two forward stations thereof, namely, at the station of the forwardly positioned vertical and horizontal transverse struts and at the station immediately behind the former. The wing may be internally trussed and thus reinforced relative to the fuselage frame, or the wing may be reinforced relative to the fuselage by diagonal braces or struts 6, extending from the lower longéron of the frame of the fuselage outwardly to the wing intermediate its connection with the frame of the fuselage and its outer ends, as shown in Fig. 3.

Between the two forward stations of the frame of the fuselage, designated A and B, is the passenger or baggage cockpit M, and between the station B and the station C, immediately behind the former, is positioned the pilot's cockpit N. The cowling 3 forming in general the outline of said cockpits, is positioned sufficiently below the lower side of the wing 5 so that clear vision ahead may be had below the wing and above the cowling of the fuselage and the hood 4 at the upper side of the nose 2 of the aeroplane. Thus, it will be seen that the upper longérons at the first two sections of the frame of the fuselage, as well as the vertical struts and diagonal braces between said portions of said longérons and said cowling, are exposed. Such a structure presents a false support for the cockpit.

The nose 2 of the aeroplane is of the same depth as the distance from the top of the cowling to the bottom of the fuselage and of less depth than the depth of the frame of the fuselage at the forward end thereof. Said nose is made a separate unit and bolted at the upper and lower portions of its rear end to the upper and lower portions of the front end of the frame of the fuselage 1. The connection of the nose 2, as a separate unit, to the forward end of the frame of the fuselage permits the same to be constructed of the depth desired, to be constructed rigidly, as well as to provide a detachable nose for the aeroplane whereby repair is readily facilitated. It will be noted that the nose 2 of the engine consists of a rigid frame and is provided with struts 2ª extending from the forward end of the nose, which is lower than the upper portion of the frame of the fuselage, to the upper portion and lateral sides of the latter, substantially as shown.

The cockpits M and N, although open, are provided with means of entrance and exit at the sides, such means of entrance and exit being provided respectively with doors 7 and 8, as shown in Fig. 2. The doors 7 and 8 are constructed in substantially right triangularly shaped form and are hinged at their one short side to the vertical transverse strut of the fuselage 1 at the stations A and B. The hypotenuse sides of said triangularly shaped doors extend upwardly and rearwardly along the diagonal braces 1ᵇ, extending diagonally between opposite stations of the frame of the fuselage, as shown in Fig. 2. The doors 7 and 8 may also include portions of the cowling as shown by 7ª and 8ª, as shown in the drawings. Thus entrance and exit may be had to and from the cockpit of the fuselage through the sides thereof.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In a monoplane, a fuselage, a wing mounted on the forward and upper portion of said fuselage and contiguous with the upper longérons thereof, the forward portion of the fuselage being provided with a cockpit and with cowling around said cockpit and spaced below the lower side of said wing and below said upper longérons, and a unitary nose separately secured to the forward end of said fuselage with its upper side in line with said cowling and provided with braces connecting the same with the upper portion of the forward end of the fuselage.

2. In a monoplane, a wing, a fuselage, comprising a main portion including upper longérons extending forwardly to a line near the forward edge of said wing and contiguous with the lower surface thereof, cockpits positioned within said main portion below and rearwardly of said wing, and a nose portion extending forwardly of said wing, the upper surface of said nose portion being offset downwardly with respect to said wing allowing a clear view between said wing and said nose portion from said cockpits.

3. In a monoplane, a wing, a fuselage, comprising a main portion including upper longérons extending forwardly to a line near the forward edge of said wing and contiguous with the lower surface thereof, the side surfacing of said main portion under said wing terminating a distance below the lower surface of said wing, cockpits positioned within said main portion below and rearwardly of said wing, and a nose portion extending forwardly of said wing, the upper surface of said nose portion being offset downwardly with respect to said wing, whereby clear forward vision is obtained from said cockpits between said wing and nose portion, and sidewise between said wing and the side surface of said main fuselage portion.

4. In a monoplane, a wing, a fuselage, comprising a main portion including upper longérons extending forwardly to a line near the forward edge of said wing and contiguous with the lower surface thereof, the fixed upper and side surfacing of said main portion terminating near the rear edge of said wing, the upper longérons being exposed over their forward portions, doors in the sides of said fuselage below said wing, the upper edge of said doors being spaced a distance below said upper longérons, cockpits positioned within said main fuselage portion below and rearwardly of said wing and accessible through said doors, and a nose portion extending forwardly of said wing and having a downwardly offset upper surface relative to the forward wing edge, whereby clear vision is obtained from said cockpits forwardly between said wing and nose portion and sidewise between said wing and the upper edges of said doors.

In testimony whereof, I have hereunto set my hand at San Diego, California, this 23rd day of November, 1926.

TUBAL C. RYAN.